United States Patent
Takeshima et al.

(10) Patent No.: US 8,252,374 B2
(45) Date of Patent: Aug. 28, 2012

(54) PARTICULATE MATTER PURIFYING DEVICE AND MANUFACTURING METHOD THEREOF

(75) Inventors: Shinichi Takeshima, Numazu (JP); Kotaro Hayashi, Mishima (JP); Kohei Yoshida, Gotenba (JP); Atsushi Hayashi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 534 days.

(21) Appl. No.: 12/083,915

(22) PCT Filed: Oct. 23, 2006

(86) PCT No.: PCT/JP2006/321013
§ 371 (c)(1),
(2), (4) Date: Apr. 21, 2008

(87) PCT Pub. No.: WO2007/046526
PCT Pub. Date: Apr. 26, 2007

(65) Prior Publication Data
US 2009/0241524 A1    Oct. 1, 2009

(30) Foreign Application Priority Data
Oct. 21, 2005    (JP) ................................ 2005-307473

(51) Int. Cl.
*B01D 50/00*    (2006.01)
(52) U.S. Cl. .......... 427/244; 422/177; 60/299; 427/402; 427/430.1
(58) Field of Classification Search ............ 55/522–524; 60/297; 422/168–172, 177–182
See application file for complete search history.

(56) References Cited

U.S. PATENT DOCUMENTS

| | | | |
|---|---|---|---|
| 3,109,715 A * | 11/1963 | Johnson et al. | 422/171 |
| 5,100,632 A | 3/1992 | Dettling et al. | |
| 5,627,124 A | 5/1997 | Farrauto et al. | |
| 6,255,249 B1 | 7/2001 | Voss et al. | |
| 6,294,140 B1 | 9/2001 | Musmann et al. | |
| 6,464,946 B1 * | 10/2002 | Yamada et al. | 422/177 |

(Continued)

FOREIGN PATENT DOCUMENTS

EP    0 766 993    3/2003

(Continued)

OTHER PUBLICATIONS

Supplementary European Search Report dated Oct. 6, 2008.
International Search Report.

*Primary Examiner* — Duane Smith
*Assistant Examiner* — Amber Orlando
(74) *Attorney, Agent, or Firm* — Finnegan, Henderson, Farabow, Garrett & Dunner, LLP (57) ABSTRACT

To provide a particulate matter purifying device which is capable of providing excessive deposition of particulate matter. In the particulate matter purifying device, a catalyst element 11 is carried on a porous filter substrate 10 through which an exhaust gas passes. The particulate matter purifying device traps particulate matter contained in the exhaust gas, and oxidizing the trapped particulate matter to remove. This particulate matter purifying device is characterized in that active oxygen producing fine particles 12 are carried on a surface of the filter substrate 10 between the catalyst elements 11. Therefore, the particulate matter is partially damaged by the active oxygen produced by the active oxygen producing fine particles 12. Consequently, oxidization of the particulate matter is promoted so that deposition of the particulate matter is prevented or minimized.

4 Claims, 3 Drawing Sheets

U.S. PATENT DOCUMENTS

| | | | |
|---|---|---|---|
| 6,649,563 B2 * | 11/2003 | Nakanishi et al. | 502/439 |
| 6,877,313 B1 * | 4/2005 | Phillips et al. | 60/297 |
| 6,881,384 B1 * | 4/2005 | Uenishi et al. | 422/177 |
| 2004/0033175 A1 * | 2/2004 | Ohno et al. | 422/180 |
| 2004/0120865 A1 * | 6/2004 | Yamamoto et al. | 422/177 |
| 2004/0161596 A1 * | 8/2004 | Taoka et al. | 428/304.4 |
| 2004/0219077 A1 * | 11/2004 | Voss et al. | 422/177 |
| 2005/0160710 A1 * | 7/2005 | Taoka et al. | 55/523 |
| 2006/0194018 A1 | 8/2006 | Ohno et al. | |
| 2008/0042104 A1 * | 2/2008 | Chen et al. | 252/372 |

FOREIGN PATENT DOCUMENTS

| | | |
|---|---|---|
| EP | 1 267 047 | 8/2004 |
| JP | 63-65927 | 3/1988 |
| JP | 7-106290 | 11/1995 |
| JP | 09-094434 | 4/1997 |
| JP | 2001-271634 | 10/2001 |
| JP | 2002-371824 | 12/2002 |
| JP | 2003-190793 | 7/2003 |
| WO | WO 2005/037405 A1 | 4/2005 |

* cited by examiner

PARTICULATE MATTER PURIFYING DEVICE AND MANUFACTURING METHOD THEREOF

TECHNICAL FIELD

This invention relates to a device comprising a catalyst for purifying combustion exhaust gas of a diesel engine or the like, and more particularly, to a catalyst for removing particulate matter, especially carbon soot particles contained in the exhaust gas, and to a manufacturing method thereof.

BACKGROUND ART

A filter for removing particulate matter from an exhaust gas emitted to the atmosphere is known in the art. For example, Japanese Patent Laid-Open No. 9-94434 discloses a wall flow type waste gas purifying filter. According to the invention disclosed in Japanese Patent Laid-Open No. 9-94434, the particulate matter is trapped in the pores formed in a filter substrate when the exhaust gas passes therethrough, and the particulate matter is oxidized by a catalyst carried inside of the pores.

Japanese Patent Publication No. 07-106290 discloses a catalyst mixture consisting essentially of a platinum group metal and an alkaline earth metal oxide which is used in the filter of this kind. According to the invention disclosed in Japanese Patent Publication No. 07-106290, the catalyst mixture is carried on the filter element walls by a deposition method. Also, Japanese Patent Laid-Open No. 2001-271634 discloses an exhaust emission control device, in which a carried catalyst contains an active oxygen discharging agent.

Basically, a filter for removing the particulate matter is adapted to trap the particulate matter contained in the exhaust gas on an outer surface of a porous filter wall (or filter substrate) and an inner surface of a pore, when the exhaust gas passes through the filter wall. According to the inventions disclosed in the above-mentioned publications, the trapped particulate matter is removed by oxidizing (or combusting) the trapped particulate matter aggressively through the catalyst.

The oxidation reaction is produced by active oxygen produced by the catalyst taught by Japanese Patent Laid-Open No. 9-94434 or Japanese Patent Publication No. 07-106290, or by active oxygen emitted in a reducing atmosphere from the active oxygen discharging agent contained in the catalyst taught by Japanese Patent Laid-Open No. 2001-271634. However, the activation region is limited within the range of several nm from the place where the active oxygen is produced.

Figure 5:
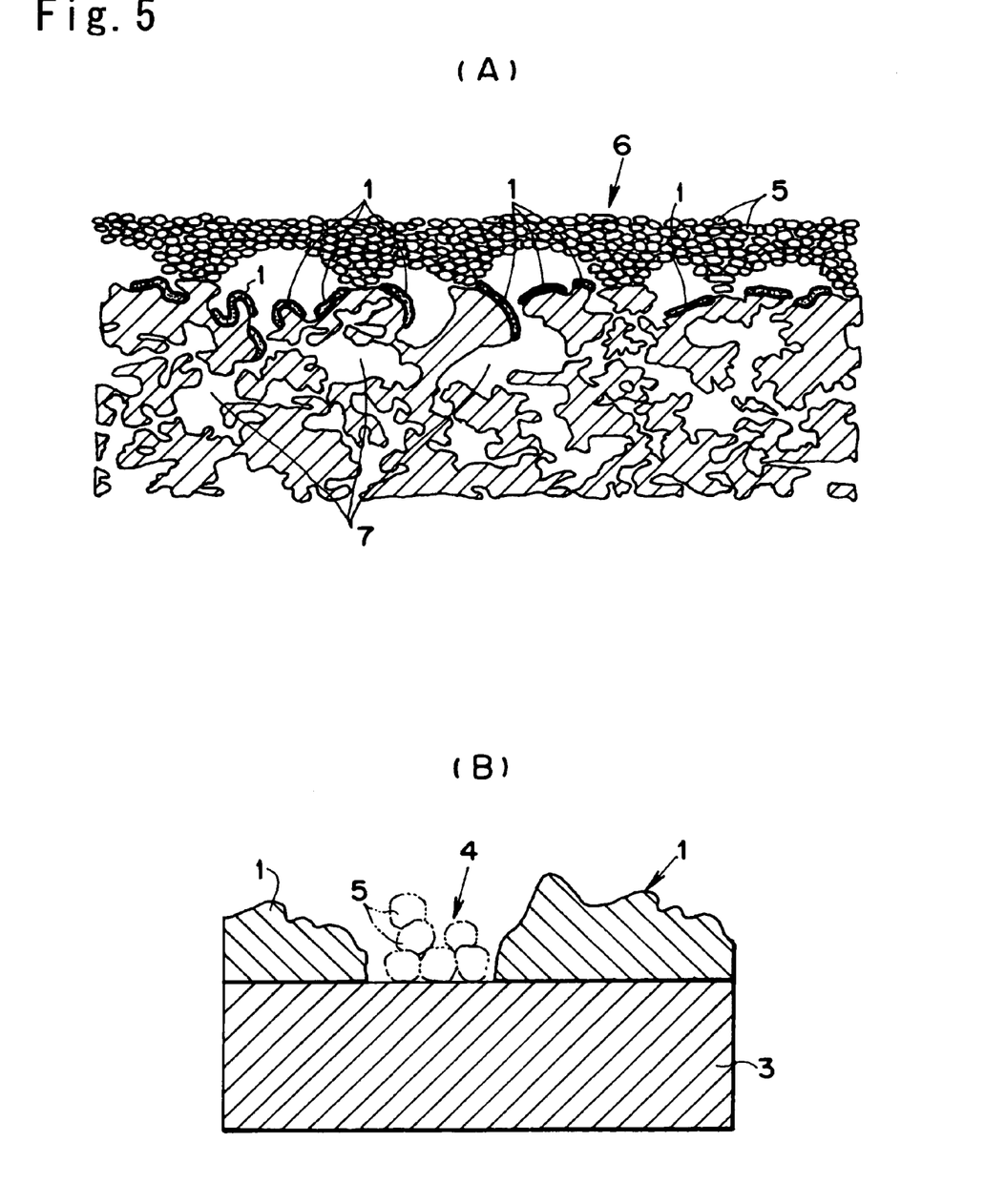

Meanwhile, the catalyst is carried on the filter substrate by a various method e.g., by a deposition method taught by Japanese Patent Publication No. 07-106290. However, since the catalyst is a particulate material, the catalyst may not always be carried densely on the surface of the filter substrate. For example, an uncoated area 4 where the surface of the filter substrate 3 is exposed is created between catalyst particles 1 as illustrated in FIG. 5 (B). In case a distance of the uncoated area 4 is several μm to about 100 μm, a particulate matter 5 may adhere to (or is trapped on) the uncoated area 4, and the particulate matter 5 may be deposited thereon without being oxidized by the active oxygen.

As a matter of course the particulate matter 5 thus deposited does not comprises a catalytic element on its surface. Moreover, since the particulate matter 5 thus deposited is distant from the peripheral catalyst particles 1, there still remains the uncoated area 4. Therefore, the subsequent particulate matter 5 will adhere thereto and will be deposited without being oxidized. FIG. 5 (A) schematically shows such sedimentation. As shown in FIG. 5 (A), the particulate matter 5 adheres to and deposited on the uncoated area 4 grows gradually to form a bridge beam like shape. Eventually, adjoining upper end portions of the bridge beams will be connected with each other. As a result, the particulate matter 5 forms a porous membrane 6 on an outer surface of the filter substrate 3.

If the porous membrane 6 is formed on the outer surface of the filter substrate 3, the particulate matter 5 in an exhaust gas is trapped by the porous membrane 6 when the exhaust gas passes through the porous membrane 6. This means that, the particulate matter 5 cannot reach the filter substrate 3 carrying the catalyst thereon. That is, although it is possible to trap the particulate matter 5, the particulate matter 5 cannot be oxidized to be removed. As a result, an amount of the trapped particulate matter 5 may be accumulated excessive.

Here, it is assumed that the uncoated area without having the catalyst also exists on an inner surface of a pore 7 in the filter substrate 3; however, above-explained sedimentation is not especially confirmed. This is because the particulate matter 5 may be moved within the pore 7 to be oxidized due to the fact that: the spatial configuration in the pore 7 is rather complicated; the flow rate of the exhaust gas is high; and the flow force of the exhaust gas is likely to act on the particulate matter 5 to move the particle matter 5 along the inner surface of the pore 7.

DISCLOSURE OF THE INVENTION

The present invention has been conceived noting the aforementioned technical problems, and has an object to provide a particulate matter purifying device capable of preventing particulate matter from being deposited excessively on an outer surface of a filter substrate, and to provide a manufacturing method thereof.

In order to achieve the aforementioned object, according to the present invention, there is provided a particulate matter purifying device in which a catalyst element is carried on a porous filter substrate through which an exhaust gas passes, for trapping particulate matter contained in the exhaust gas, and oxidizing the trapped particulate matter to remove, characterized in that: active oxygen producing fine particles are carried on a surface of the filter substrate between the catalyst elements.

On the filter substrate, an active oxygen producing fine particulate layer formed of the active oxygen producing fine particles, and a catalyst carrying layer formed of the catalyst element, are formed in sequence.

In addition to above, an oxide layer different from both the filter substrate and the catalyst element is formed on the filter substrate, and the active oxygen producing fine particles or the active oxygen producing fine particulate layer is/are situated on the oxide layer.

According to another aspect of the invention, there is provided a method for manufacturing a particulate matter purifying device in which a catalyst element is carried on a porous filter substrate through which an exhaust gas passes, for trapping particulate matter contained in the exhaust gas, and oxidizing the trapped particulate matter to remove, characterized by comprising: coating the filter substrate to which solution of lipophilic group is being adsorbed, with active oxygen producing fine particles; and the catalyst element including an oxidation catalyst is carried on the active oxygen producing fine particles.

According to still another aspect of the invention, there is provided a method for manufacturing a particulate matter purifying device in which a catalyst element is carried on a porous filter substrate through which an exhaust gas passes, for trapping particulate matter contained in the exhaust gas, and oxidizing the trapped particulate matter to remove, characterized by comprising: forming a metal oxide layer on the filter substrate using nonpolar solvent and metallic alkoxide solution; thereafter coating the oxide layer with active oxygen producing fine particles; and thereafter carrying the catalyst element including an oxidation catalyst on the active oxygen producing fine particles.

According to the invention, the active oxygen producing fine particle is an oxide fine particle or a compound oxide fine particle producing active oxygen in a reducing atmosphere. Specifically, fine particles of magnesium oxide, ceria or ceria-zirconia composite oxide may be used in the invention.

On the other hand, the oxide layer may be formed of any of alumina, silica and zirconia, or a compound oxide containing those oxides.

Further, the filter substrate of the invention may be formed of a porous material of any of cordierite, carborundum, a nonwoven ceramic, and a wire mesh. Also, the catalyst element may contain at least one of platinum, palladium and rhodium, and any of barium and ceria.

According to the invention, the active oxygen producing fine particles are thus carried on the surface of the filter substrate between the catalyst elements. Therefore, the particulate matter adhering between the catalyst elements is oxidized by the active oxygen produced by the active oxygen producing fine particles. As a result, the particulate matter is oxidized and removed. Specifically, the particulate matter is damaged by the active oxygen so that the oxidization of the particulate matter is facilitated, and the particulate matter is thereby removed. For this reason, an excessive deposition of the particulate matter resulting from adhesion and growth thereof can be avoided or minimized even if the filter substrate has a portion where there is no catalyst element.

Also, according to the invention, even if the catalyst elements are isolated from each other so that the uncoated area exists therebetween, the active oxygen producing fine particulate layer is formed underneath the catalyst carrying layer, and partially exposed on the uncoated area. Therefore, the surface of the filter substrate can be prevented from being directly exposed as the uncoated area, or the uncoated area can be minimized. Thus, the above-explained structure of the invention can be achieved. For this reason, even if the filter substrate has a portion where the catalyst element does not exist on its surface, an excessive deposition of the particulate matter resulting from adhesion and growth thereof can be avoided or minimized.

Moreover, according to the invention, the active oxygen producing fine particles or the active oxygen producing fine particulate layer can be formed homogeneously. As described above, an oxidative product such as cordierite or the like is used as the filter substrate, therefore, polar character thereof is partially different. For example, there exist portions of different polarity such as a portion consisting of MgO and MgOH, and a portion consisting of $SiO_2$. However, according to the invention, such partial difference of the polar character is unified by forming the oxide layer on the filter substrate. As a result, the active oxygen producing fine particles can be adhered to the oxide layer homogeneously so that the active oxygen producing fine particulate layer can also formed homogeneously.

Further, according to the invention, the solution of lipophilic group is adsorbed to the filter substrate as a preparation for the operation to carry the active oxygen producing fine particles. Namely, the solution has excellent affinity for the filter substrate, and it charges the surface of the filter substrate to the plus polarity. When a solution containing ions or complex ions of metallic element of the active oxygen producing fine particles (i.e., oxide particles or compound oxide particles) is contacted with the surface of the filter substrate charged to plus polarity, said ions or complex ions adhere to the filter substrate. As a result, the active oxygen producing fine particles can be adsorbed homogeneously so that the active oxygen producing fine particulate layer can be formed homogeneously. For this reason, it is possible to prevent from leaving the uncoated area where the surface of the filter substrate is exposed directly between the catalyst elements.

Furthermore, according to the invention, if a metallic alkoxide solution containing aluminum alkoxide or the like and a nonpolar solvent solution are adsorbed to the filter substrate, the nonpolar solvent solution is attached to the portion where the polarity thereof is comparatively week (e.g., the portion consisting of $SiO_2$ in case of cordierite), and a metallic oxide such as alumina is separated out when dried and sintered at a subsequent process. On the other hand, at the hydrophilic portion (e.g., the portion consisting of MgO or MgOH in case of cordierite), the hydrophilic metallic alkoxide is hydrized so that a metallic oxide such as alumina is separated out. Thus, the metal oxide layer of alumina or the like is formed homogeneously all over the surface of the filter substrate. As a result, the active oxygen producing fine particles or the active oxygen producing fine particulate layer can be formed homogeneously through the metal oxide layer.

BRIEF DESCRIPTION OF THE DRAWINGS

FIGS. 5 (A) and (B) are diagrams showing the state where the particulate matter grows into a bridge beam like shape to form a porous membrane.

BEST MODE FOR CARRYING OUT THE INVENTION

Figure 1:
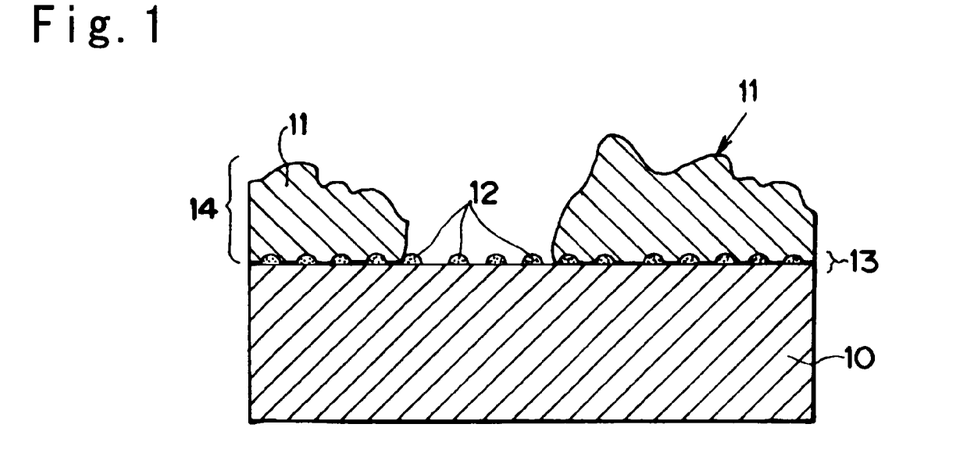
FIG. 1 is a diagram schematically showing a portion of a particulate matter catalyst used in a particulate matter purifying device of the invention.

The particulate matter purifying device of the present invention comprises a filter substrate 10 for trapping particulate matter contained in exhaust gas emitted from a thermal engine such as a diesel engine. FIG. 1 schematically shows a portion of the filter substrate 10 in an enlarged scale. As a substrate of a conventional DPF (i.e., Diesel Particulate Filter) and a DPNR (i.e., Diesel Particulate-NOx Reduction), the filter substrate 10 is made of porous ceramic. Specifically, cordierite ($2MgO.2Al_2O_3.5SiO_2$), carborundum (SiC), a nonwoven ceramic, a wire mesh and so on can be used as the filter substrate 10.

A catalyst element 11 is carried on the filter substrate 10. The catalyst element 11 is selected from a noble metal, an NOx occlusion material and an oxygen occlusion material according to the purpose of purification of exhaust gas. For example, platinum (Pt), palladium (Pd), rhodium (Rh) or the like is carried as the noble metal, barium (Ba) is carried as the NOx occlusion material, and ceria ($CeO_2$) is carried as the oxygen occlusion material. Those catalyst elements 11 may be carried by a known method, such as a slurry method (or an impregnation method) in which slurry containing the above-mentioned catalyst elements is adsorbed to the filter substrate 10 and then dried and sintered, or a dipping method in which the filter substrate 10 is dipped into a solution containing the above-mentioned catalyst elements and then dried and sintered.

In order to enhance the activity and to enlarge a surface area, the catalyst elements 11 having the grain diameter of several tens μm are used, and such catalyst elements 11 are dispersed and carried on the filter substrate 10. The catalyst elements 11 are isolated from each other due to a local concentration difference thereof or the like when they are carried. As a result, a portion where the catalyst element 11 is not carried is created on the surface of the filter substrate 10 in the range from several μm to approximately 100 μm. This area corresponds to the aforementioned uncoated area 4.

According to the invention, active oxygen producing fine particles 12 are carried on the portion corresponding to the uncoated area 4. The active oxygen producing fine particles 12 are fine particles of oxides or compound oxides which produce active oxygen ($O_2^-$) in a reducing atmosphere, for example, magnesium oxide (MgO), ceria ($CeO_2$), ceria zirconia compound oxide (CeZrOx) and so on. Preferably, a grain diameter of the active oxygen producing fine particles 12 is as small as possible. Specifically, the active oxygen producing fine particles 12 are adjusted to have a diameter of 1 μm to 10 μm.

First of all, the active oxygen producing fine particles 12 are dispersed on the surface of the filter substrate 10 homogeneously as much as possible to form an active oxygen producing fine particulate layer 13, instead of carrying the active oxygen producing fine particles 12 selectively on the portion corresponding to the uncoated area 4 between the catalyst elements 11. Then, the catalyst elements 11 are carried thereon to form a catalyst carrying layer 14. As a result, even if clearances exist between the catalyst elements 11, the active oxygen producing fine particles 12 forming the active oxygen producing fine particulate layer 13 are exposed on in the clearance. That is, the active oxygen producing fine particles 12 are arranged between the catalyst elements 11.

In case of carrying the active oxygen producing fine particles 12 directly on the filter substrate 10, a lipophilic solution containing phenyl groups or the like is adsorbed to the filter substrate 10 first of all, then, ionized or complex ionized active oxygen producing fine particles 12 are adsorbed thereon, and then, dried and sintered. As a result, the active oxygen producing fine particles 12 are dispersed by an electrical force so that the active oxygen producing fine particles 12 can be carried on the filter substrate 10 homogeneously. Here, a benzalkonium chloride solution, a pyromellitic solution, a fumaric solution, an organic acid-base solution and so on may be used as the lipophilic solution.

For example, the filter substrate 10 thus carrying the catalyst elements 11 and the active oxygen producing fine particles 12 is used to constitute a wall through type particulate matter purifying device, which traps particulate matter contained in exhaust gas of a diesel engine or the like by transmitting the exhaust gas therethrough. In this case, the particulate matter may be trapped both on the catalyst elements 11 and on the portion other than the catalyst elements 11. On the portion where the catalyst element 11 is not carried, the active oxygen producing fine particles 12 are exposed as explained above. Therefore, the particulate matter trapped on the portion where the catalyst element 11 does not exist may not be oxidized directly by the catalyst element 11. However, the trapped particulate matter adheres to the active oxygen producing fine particles 12. Accordingly, for example, when active oxygen is produced in the reducing atmosphere, the particulate matter adhering to the active oxygen producing fine particles 12 is oxidized by the produced active oxygen.

As a result of an examination of a pattern of the oxidization, the following facts have been confirmed. In order to examine a relation between a concentration of $CO_2$ to be produced and a temperature, a combustion exhaust gas of a diesel engine containing particulate matter was flown through the filter substrate 10 of the invention carrying the active oxygen producing fine particles 12 and the catalyst element 11, while raising the temperature by 10° C. per minute. Here, the air content was 21%. The results are shown in FIG. 2.

In case an air-fuel ratio (A/F) was pulsed to be shifted from lean to stoichiometric or rich temporarily, $CO_2$ concentration reached a maximum concentration at a low temperature, i.e., at a temperature of just above 400° C. On the other hand, in case of steady state condition where the air-fuel ratio was kept to lean, $CO_2$ concentration reached a maximum concentration at a temperature of approximately 600° C. Judging from the results, it is contemplated that active oxygen was produced by the active oxygen producing fine particles 12 in the reducing atmosphere resulting from the temporal increase in the air-fuel ratio, and oxidization of the adhering particulate matter was thereby promoted.

Figure 3:
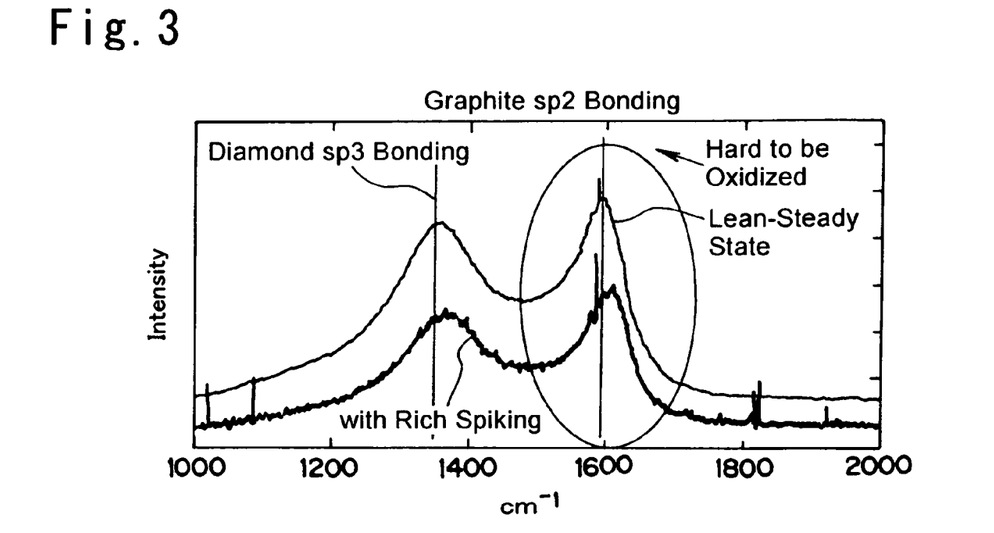
FIG. 3 is a graph plotting a result of Raman analysis of conformation of the particulate matter.

Also, in order to analyze changes in the form of the particulate matter resulting from carrying out a rich spiking for changing the air fuel ratio to the rich side, Raman analysis was carried out. Results are shown in FIG. 3. As can be seen from FIG. 3, both diamond bonding and graphite bonding of the particulate matter were confirmed. However, in case of carrying out the rich spiking, intensities of both diamond bonding and graphite bonding were lower than those of the case of lean-steady state due to oxidization.

Figure 2:
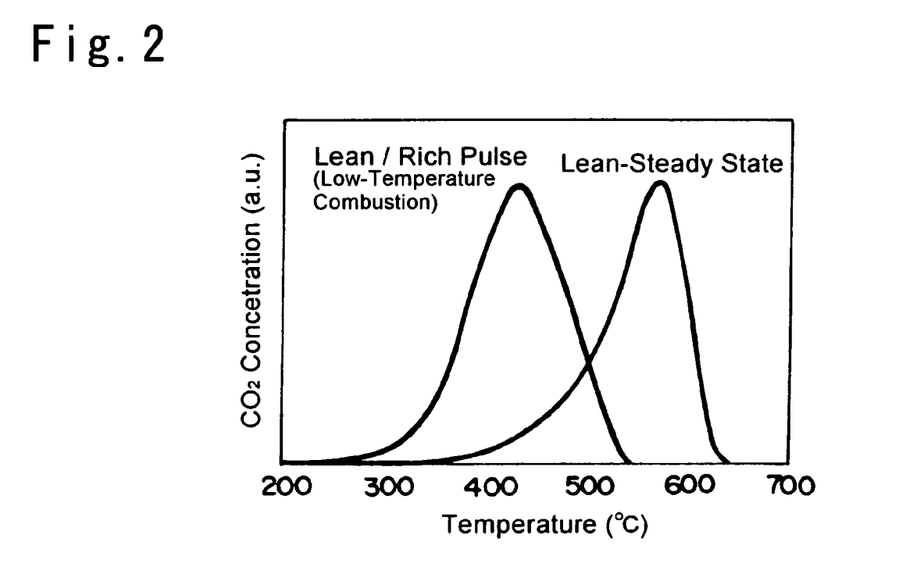
FIG. 2 is a graph plotting a measurement result of a relation between $CO_2$ concentration and temperature in the case of purifying exhaust gas by the particulate matter purifying device of the invention.

Judging from the results shown in FIGS. 2 and 3, it has been confirmed that the particulate matter in graphite bonding which is generally hard to be oxidized was oxidized at comparatively low temperature. A mechanism of such oxidization is estimated as explained in the following. Specifically, the trapped particulate matter is not successively oxidized and removed but rather agglomerates to achieve graphite bonding. However, the active oxygen produced by the active oxygen producing fine particles 12 in the reducing atmosphere is adsorbed to a graphite pi electron, and a graphite structure is thereby damaged. For this reason, it is estimated that the remaining portion is easily to be oxidized so that the entire particulate matter is rapidly oxidized and removed.

Here, the trapped particulate matter adhering to the catalyst element 11 is oxidized and removed through the catalyst. According to the device of the invention, therefore, the oxidization of the particulate matter trapped on the portion outside the reach of the oxidization of the catalyst element 11 can be promoted by the active oxygen produced by the active oxygen producing fine particles 12, so that the particulate matter trapped on such portion can be oxidized to be removed at comparatively low temperature. For this reason, an excessive deposition of the particulate matter can be avoided or minimized. Therefore, the filter substrate 10 and the particulate matter purifying device can be prevented from being damaged by an impetuous burning of the deposition of the particulate matter at high temperature.

According to the invention, it is possible to improve activity of the catalyst layer by adsorbing active particles of ceria, magnesia, ceria zirconia etc. on the filter substrate 10, and coating the filter substrate 10 to which the active particles are adsorbed with the catalyst layer. Therefore, hydrocarbon (HC) emissions can be reduced, and the activity of the catalyst layer at low temperature can be improved. Moreover, since a deposition amount of the particulate matter and a pressure drop of the exhaust gas are mutually related, the deposition amount of the particulate matter can be found by detecting a pressure of exhaust gas. For this reason, a timing to carry out a rich spiking can be controlled appropriately.

As explained above, according to the invention, the active oxygen producing fine particles 12 are carried between the catalyst elements 11. Therefore, it is preferable to carry the active oxygen producing fine particles 12 homogeneously as much as possible. For this purpose, it is preferable to form an intermediate layer on which the active oxygen producing fine particulate layer 13 is to be formed, instead of carrying the active oxygen producing fine particles 12 directly on the filter substrate 10. That is, the intermediate layer is an oxide layer 15, which is provided to eliminate variation in affinity of the surface of the filter substrate 10 for the active oxygen producing fine particles 12. The oxide layer 15 is formed of an oxidative product such as alumina, silica, zirconia or the like, or a compound oxide containing those oxidative products. Thus, the material of the oxide layer 15 is an oxidative product or a compound oxide different from those of the filter substrate 10 and the active oxygen producing fine particles 12. An example thereof is shown schematically in FIG. 4.

Figure 4:
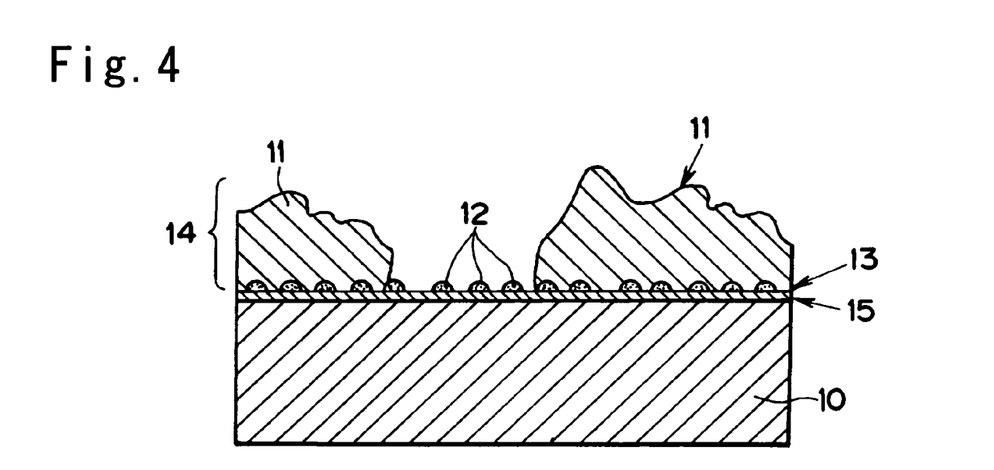
FIG. 4 is a diagram schematically showing a portion of a particulate matter catalyst used in a particulate matter purifying device of the invention in which an oxide layer is formed as a substrate for the active oxygen producing fine particulate layer.

The oxide layer 15 can be formed by the method to be explained in the following. The filter substrate 10 made of cordierite or the like has both hydrophilic portion and lipophilic portion. Therefore, first of all, the filter substrate 10 is dipped into a nonpolar solvent mixed with an organic metallic compound. A solvent of hexane, cychlohexane, toluene, 1-butanole, 1-hexanol or the like may be suitable to be used as the nonpolar solvent. Especially, a solvent whose polarity is weak, i.e., relative permittivity is less than 20 is suitable. On the other hand, metallic alkoxide such as aluminum alkoxide or the like can be used as the metallic compound. After contacting the filter substrate 10 with the above-explained aqueous solution, the filter substrate 10 is then dried and sintered.

As a result, at the hydrophilic portion of the filter substrate 10 (e.g., the portion consisting of MgO in case of cordierite), the hydrophilic metallic alkoxide is hydrized so that a metallic oxide is separated out. On the other hand, the hydrophilicity of the nonpolar solvent to the nonhydrophilic portion is excellent so that the nonpolar solvent adsorbs to the nonhydrophilic portion sufficiently. For this reason, a large amount of the metallic oxide is separated out when dried and sintered. Thus, the metallic oxide is carried in conformity with the two different characteristics of the filter substrate 10. Therefore, the oxide layer can be formed homogeneously all over the surface of the filter substrate 10.

In case of adsorbing the aforementioned active oxygen producing fine particles 12 to the oxide layer 15 thus formed, the complex ion adsorption method can also be used to adsorb the active oxygen producing fine particles 12 converted into complex ions. Here, an organic acid such as succinic acid, malic acid, tartaric acid, citric acid or the like can be used to produce the complex ion.

Next, here will be explained examples to carry out the invention and a comparison example.

EXAMPLE 1

First of all, 2 liters of cordierite for the filter substrate was dipped into an aqueous solution prepared by dissolving 70 gram of metallic alkoxide such as aluminum alkoxide (aluminum tri-sec-butoxide, to be abbreviated as "ASBD" hereinafter) into 4 liters of a nonpolar solvent of cyclohexane. After lifting the cordierite substrate from the solution, extra solution was blown off, and then the cordierite substrate was dried and sintered. As a result, alumina was produced on the cordierite substrate homogeneously.

Then, particle $CeZrO_4$ as the active oxygen producing fine particles was adsorbed to the cordierite substrate where alumina was separated out, by the complex ion adsorption method. Specifically, in order to prepare a complex ionic solution as a mixed liquid of zirconium and cerium, 0.05 mols of oxynitrate zirconium and cerium nitrate were collected individually, and dissolved in 4 liters of distilled water. Then, 118 g of ammonium dihydrogen citrate, and 61 g of ammonium citrate tribasic were added into the solution.

Thereafter, the cordierite substrate to which alumina was adsorbed was dipped into the complex ionic solution to adsorb complex ions. In order to promote the diffusion of the solution, the cordierite substrate was moved up and down in the solution, and this absorption process was continued for one hour. As a result, zirconium complex ions and cerium complex ions in the solution were absorbed to the cordierite substrate almost completely.

After that, the cordierite substrate to which the aforementioned complex ions were adsorbed was coated with a carrier, and noble metal and NOx occlusion material were carried thereon. As a result, a DPNR catalyst was prepared. Those coating process of the carrier, and the carrying process of the noble metal and NOx occlusion material were carried out by known methods. Specifically, the cordierite substrate is impregnated with slurry containing alumina and alumina sol, and then dried and sintered to form a coat layer. After that, the cordierite substrate was impregnated with a predetermined amount of barium acetate of predetermined concentration, and heated to carry barium (Ba). Then, the carried barium was changed into carbonate using ammonium bicarbonate.

After that, platinum was carried thereon using an aqueous solution of dinitrodiamine platinum nitrate, and rhodium was further carried using an aqueous solution of rhodium nitrate.

COMPARISON EXAMPLE

As a base of comparison, a DPNR catalyst was prepared by a conventional method. Specifically, the DPNR catalyst was prepared by coating a cordierite substrate with a carrier, and by carrying noble metal and NOx occlusion material thereon, without carrying out a process of adsorbing particle $CeZrO_4$ of the example 1.

(Evaluation)

A deposition amount of the particulate matter was measured. If the filter functions properly, the particulate matter enters into pores formed on the filter substrate. Consequently, a predetermined relation is established between the deposition amount and a pressure drop. This means that the deposition amount of the particulate matter can be found by detecting a pressure of exhaust gas. However, as explained with reference to FIG. 5, if the particulate matter deposits on the outer surface of the filter substrate, the particulate matter grows to form a bridge beam like shape. Eventually, adjoining upper end portions of the bridge beams will be connected with each other. As a result, the particulate matter forms a porous membrane on an outer surface of the filter substrate. If the porous membrane is formed on the outer surface of the filter substrate, the particulate matter is trapped by the porous membrane. That is, the particulate matter will not enter into the pores. This means that the relation between deposition amount and the pressure drop will be no longer available. For this reason, the deposited particulate matter is directly oxidized to be changed into $CO_2$ in both DPNR catalysts of the example 1 and the comparison example, and the evaluations were made by analyzing $CO_2$.

Specifically, a vehicle equipped with an inline four-cylinder direct diesel-injection engine was used in the experimentations. The engine was equipped with the (2 liter of) DPNR catalysts of the example 1 and the comparison example in each experiment. In both experiments, an endurance running of the vehicle of 200 kilometer at the maximum speed of 120 km/h was carried out, and then, a deposition amount of the particulate matter was measured. In addition to above, a rich spiking of 2 seconds at intervals of 20 seconds was carried out. As a result of the experiments, the deposition amount of the particulate matter was 4.5 g/L according to the DPNR of the comparison example. On the other hand, according to the DPNR of the example 1, the deposition amount of the particulate matter was only 0.9 g/L. Thus, according to the device of the invention, the deposition amount of the particulate matter was reduced drastically. This means that oxidation capacity of the particulate matter is improved.

The reason of such improvement is inferred as explained in the following. Namely, according to the comparison example, a preparation to carry the active oxygen producing fine particles such as particle $CeZrO_4$ was omitted. For this reason, the outer surface of the filter substrate or the coat layer for noble metal and NOx occlusion material were exposed directly at the portion of the filter substrate where the catalyst element was not carried. As explained above, the particulate matter adsorbed or trapped on the portion on which the catalyst element is not carried is hard to be oxidized. Therefore, such particulate matter grows into a bridge beam like shape, and a porous membrane is eventually formed on the outer surface of the filter substrate as illustrated in FIG. 5. As a result, an inpour rate of the particulate matter to the catalyst layer of the filter substrate is degraded, and the deposition of the particulate matter is thereby further promoted. On the other hand, according to the DPNR of the example 1, the particulate matter adsorbed or trapped on the portion of the outer surface of the filter substrate where the catalyst element does not exist can be easily oxidized by the active oxygen produced by the active oxygen producing particles existing thereon. Therefore, the particulate matter is prevented from growing into the bridge beam like shape or the porous membrane, and allowed to enter into the catalyst layer of the filter substrate successively to be oxidized and removed. For this reason, the deposition of the particulate matter is prevented from being progressed.

Additionally, one of the factors of such improvement in the oxidation capacity of the DPNR of the example 1 is considered that the active oxygen producing fine particles are carried homogeneously, in other words, the active oxygen producing fine particulate layer is formed homogeneously. According to the example 1, the oxide layer is formed as an intermediate layer between the active oxygen producing fine particulate layer and the filter (or cordierite) substrate, for the purpose of forming the active oxygen producing fine particulate layer homogeneously. It is estimated that the oxide layer functions as explained in the following.

Firstly, the cordierite substrate comprises portions having a small amount of hydroxyl group (i.e., hydrophilic portions) where hydrophilic ASBD is hydrolyzed, and alumina is separated out on these portions. Secondly, hydrophilicity of the remaining portion of the cordierite substrate having no hydrophilic group is excellent with respect to the aqueous solution of cyclohexane the polarity thereof is weak. Therefore, the aqueous solution of cyclohexane mixed with aluminum alkoxide adheres amply to the portion of the cordierite substrate having no hydrophilic group. That is, alumina is separated out amply on such portion when dried and sintered. Thus, the cordierite substrate comprises two kinds of portions having different characteristics on its surface. However, it is possible to separate out alumina homogeneously by using both kinds of reaction liquids of different characteristics, i.e., by using both hydrophilic aluminum alkoxide and lipophilic nonpolar solvent. The active oxygen producing fine particulate layer is formed on the oxide layer thus formed homogeneously, therefore, the active oxygen producing fine particulate layer is also formed homogeneously.

According to another aspect of the invention, the active oxygen producing fine particulate layer can also be formed directly on the filter substrate of cordierite or the like. The example will be explained hereinafter as the example 2.

EXAMPLE 2

First of all, 136 g of benzalkonium chloride was dissolved in 4 liters of distilled water. Then, a filter substrate of cordierite was dipped in the prepared aqueous solution and left for about 30 minutes.

Apart from above, in order to prepare a complex ionic solution as a mixed liquid of zirconium and cerium, 0.05 mols of oxynitrate zirconium and cerium nitrate were collected individually, and dissolved in 4 liters of distilled water. Then, 118 g of ammonium dihydrogen citrate, and 61 g of ammonium citrate tribasic were added into the solution.

After lifting the filter substrate from the solution of benzalkonium chloride, extra solution was blown off. Then, the filter substrate was dipped in the solution of oxynitrate zirconium and cerium nitrate to adsorb the complex ions. In order to promote the diffusion of the solution, the filter substrate was moved up and down in the solution, and this absorption process was continued for one hour. As a result, zirconium complex ions and cerium complex ions in the solution were absorbed to the filter substrate almost completely.

Then, as in the case of example 1, the filter substrate was coated with a carrier, and noble metal and NOx occlusion material were carried thereon by a known method to prepare DPNR catalyst.

As the case of example 1, an endurance running experiment was also carried out to evaluate the DPNR catalyst thus prepared. The result of the experimentation was similar to that of the DPNR catalyst of the example 1.

Specifically, particle $CeZrO_4$ functioning as the active oxygen producing fine particles can be dispersed and adsorbed on the filter substrate homogeneously. As a result, even if the catalyst elements are isolated from each other so that the catalyst elements do not exist therebetween, the active oxygen producing fine particles are exposed on such area. The particulate matter adsorbed or trapped on such area is damaged by the active oxygen, and the oxidization of the particulate matter is thereby facilitated. For this reason, an excessive deposition of the particulate matter can be avoided or minimized.

The active oxygen producing fine particulate layer is thus formed homogeneously by the function of the benzalkonium chloride solution. That is, since benzalkonium chloride contains lipophilic group, affinity thereof for the filter substrate of cordierite is excellent. Moreover, the surface of the filter substrate is charged to the plus polarity when benzalkonium chloride is adsorbed thereon. To the contrary, the aforementioned complex ions are charged to the minus polarity. That is, the complex ions and the filter substrate interact strongly with each other so that the complex ions are electrically adsorbed to almost all over the portion of the filter substrate charged to the plus polarity. As a result, the complex ions, which form the active oxygen producing fine particulate layer, are dispersed and adsorbed homogeneously on the filter substrate. For this reason, the active oxygen producing fine particulate layer can be formed homogeneously.

In order to confirm improvement in oxidative rate of the particulate matter, engine bench tests were carried out individually on the DPNR catalysts of example 1 and 2 and comparison example. A turbo diesel engine of 2 litters was used in the tests, and 2 liters of DPNR catalyst was arranged right behind a turbocharger. The engine was driven steadily at 2400 rpm with 60 Nm, and a rich spiking of 3 seconds at intervals of 40 seconds was carried out under low-temperature combustion. Under the above-mentioned condition, an exhaust gas temperature was approximately 310° C.

The engine was driven for 30 minutes under the above-mentioned condition, and the DPNR catalyst was then taken off. After that, a deposition amount of the particulate matter (i.e., carbon) in the filter was obtained from an amount of $CO_2$ emitted by the reaction with the air in an electric furnace.

As shown in the table 1, residual (or deposition) amounts of the particulate matter of the examples 1 and 2 of the invention were reduced to about one-third of that of the comparison example. Thus, the oxidation rate of the examples 1 and 2 were obviously improved. Here, characteristic of the catalyst was same in all of the catalysts of the examples 1 and 2 and the comparison example. That is, an existence of the active oxygen producing fine particulate layer on the filter substrate was the only difference. This means that such difference in oxidation rates was induced by the action of the active oxygen producing fine particulate layer. Judging from the result, it is assumed that the amount of the particulate matter depositing on the filter but not contacted directly to the catalyst is reduced.

TABLE 1

Deposition Amount of Participate Matter on DPNR After Running

| | Particulate Matter (C) Amount (g) |
|---|---|
| Comparison Example | 0.214 |
| Example 1 | 0.075 |
| Example 2 | 0.070 |

INDUSTRIAL APPLICABILITY

This invention can be utilized in the field for manufacturing a device for generating power by burning a fuel, and in the field to manufacture a device for purifying an exhaust gas

The invention claimed is:

1. A method for manufacturing a particulate matter purifying device in which a catalyst element is carried on a porous filter substrate through which an exhaust gas passes, for trapping particulate matter contained in the exhaust gas, and oxidizing and removing the trapped particulate matter, comprising:

dipping the filter substrate into a solution of lipophilic group to adsorb the lipophilic group thereto;

thereafter coating the filter substrate to which the lipophilic group is being adsorbed, with active oxygen producing fine particles; and thereafter carrying the catalyst element including an oxidation catalyst on the active oxygen producing fine particles, wherein the particulate matter purifying device manufactured in the method comprises the filter substrate, an active oxygen producing fine particulate layer including the active oxygen producing fine particles, and a catalyst carrying layer including the catalyst element, and wherein the filter substrate, the active oxygen producing fine particulate layer, and the catalyst carrying layer are discrete from each other.

2. The method for manufacturing a particulate matter purifying device as set forth in claim 1, wherein:

the active oxygen producing fine particles include an oxide fine particle or a compound oxide fine particle producing active oxygen in a reducing atmosphere.

3. The method for manufacturing a particulate matter purifying device as set forth in claim 1, wherein:

the active oxygen producing fine particles include fine particles of magnesium oxide, ceria, or ceria-zirconia composite oxide.

4. The method for manufacturing a particulate matter purifying device as set forth in claim 1, wherein:

the filter substrate is a porous material of any of cordierite, carborundum, a nonwoven ceramic, and a wire mesh; and the catalyst element includes at least one of platinum, palladium and rhodium, and any of barium and ceria.

* * * * *